(12) United States Patent
Tsuchida et al.

(10) Patent No.: US 11,410,692 B1
(45) Date of Patent: Aug. 9, 2022

(54) CARRIAGE ASSEMBLY WITH ASYMMETRICAL SWAGE BOSSES AND ASSOCIATED METHODS

(71) Applicant: Western Digital Technologies, Inc., San Jose, CA (US)

(72) Inventors: Hiroyasu Tsuchida, Fujisawa (JP); Haruhide Takahashi, Yokohama (JP); Yoshinobu Noguchi, Fujisawa (JP); Takeji Sumiya, Fujisawa (JP)

(73) Assignee: WESTERN DIGITAL TECHNOLOGIES, INC., San Jose, CA (US)

(*) Notice: Subject to any disclaimer, the term of this patent is extended or adjusted under 35 U.S.C. 154(b) by 0 days.

(21) Appl. No.: 17/522,128

(22) Filed: Nov. 9, 2021

(51) Int. Cl.
*G11B 5/48* (2006.01)

(52) U.S. Cl.
CPC .................. *G11B 5/4826* (2013.01)

(58) Field of Classification Search
None
See application file for complete search history.

(56) References Cited

U.S. PATENT DOCUMENTS

| | | | | |
|---|---|---|---|---|
| 5,262,911 A | * | 11/1993 | Cain | G11B 5/5521 29/603.03 |
| 5,313,355 A | * | 5/1994 | Hagen | G11B 5/4813 |
| 5,689,389 A | | 11/1997 | Braunheim | |
| 5,717,545 A | * | 2/1998 | Brooks, Jr. | G11B 5/4813 29/523 |
| 5,948,997 A | * | 9/1999 | Schmidt | G11B 5/4806 73/862.08 |
| 6,002,551 A | * | 12/1999 | Goss | G11B 5/486 360/264.2 |
| 6,033,755 A | * | 3/2000 | Hanrahan | B21K 21/08 29/523 |

(Continued)

OTHER PUBLICATIONS

Jongpradist, et al., Optimized baseplate geometry for ball swaging process by using finite element analysis, Songklanakarin Journal of Science and Technology, Oct. 2009, pp. 533-540, vol. 31 (5).

(Continued)

*Primary Examiner* — Brian E Miller
(74) *Attorney, Agent, or Firm* — Kunzler Bean & Adamson (57) ABSTRACT

A hard disk drive comprises a carriage assembly that comprises a carriage-arm tip with a swaging hole centered about a swaging axis. A first head-gimbal assembly comprises a tension baseplate on a first side of the carriage-arm tip with a tension swage boss located within the swaging hole. A second head-gimbal assembly comprises a compression baseplate on a second side of the carriage-arm tip with a compression swage boss located with the swaging hole. The tension swage boss comprises an uppercut that extends radially outward, away from the swaging axis, from a first backbore diameter to a second backbore diameter and a tension-boss undercut that extends radially outward, away from the swaging axis, from a tension-boss outer diameter to a first undercut diameter. The compression swage boss comprises a compression-boss undercut that extends radially outward, away from the swaging axis, from a compression-boss outer diameter to a second undercut diameter.

21 Claims, 8 Drawing Sheets

(56) References Cited

U.S. PATENT DOCUMENTS

| | | | | |
|---|---|---|---|---|
| 6,052,260 A * | 4/2000 | Segar | .................... | G11B 5/4826 360/245.9 |
| 6,128,164 A * | 10/2000 | Kant | .................... | G11B 5/4826 360/244.5 |
| 6,134,085 A * | 10/2000 | Wong | .................... | G11B 5/4813 |
| 6,183,841 B1 | 2/2001 | Hanrahan et al. | | |
| 6,368,685 B1 | 4/2002 | Schmidt et al. | | |
| 6,372,314 B1 * | 4/2002 | Schmidt | ............... | G11B 5/4813 29/523 |
| 6,372,315 B1 * | 4/2002 | Schmidt | ............... | G11B 5/4813 29/523 |
| 6,442,001 B1 * | 8/2002 | Coon | .................... | G11B 5/4833 360/244.5 |
| 7,042,680 B1 | 5/2006 | Zhang et al. | | |
| 7,130,156 B1 * | 10/2006 | Fossum | ................ | G11B 5/4813 |
| 7,633,717 B1 * | 12/2009 | Fossum | ................ | G11B 5/4826 428/131 |
| 8,049,995 B1 * | 11/2011 | Ee | ........................ | G11B 5/4813 360/255.5 |
| 8,233,239 B1 * | 7/2012 | Teo | ...................... | G11B 5/4813 360/244.6 |
| 8,804,286 B1 | 8/2014 | Aparimarn et al. | | |
| 9,013,833 B2 | 4/2015 | Aparimarn et al. | | |
| 2002/0145830 A1 * | 10/2002 | Wang | .................... | G11B 5/4813 |
| 2006/0023363 A1 * | 2/2006 | Hanrahan | ............ | G11B 5/5552 |
| 2010/0315746 A1 * | 12/2010 | Aoki | .................... | G11B 5/4813 |

OTHER PUBLICATIONS

Bamrungwongtaree, et al.. Improvement of Boss Tower for Single Ball Swaging in Hard Disk Drive, International Journal of Scientific and Research Publications, Nov. 2012, pp. 1-9, vol. 2, Issue 11.

Bamrungwong, J., Boss Tower and Baseplate Flange Optimization, Journal of Physics: Conference Series, 2019, pp. 1-7, 1391 012135, IOP Publishing.

* cited by examiner

CARRIAGE ASSEMBLY WITH ASYMMETRICAL SWAGE BOSSES AND ASSOCIATED METHODS

FIELD

This disclosure relates generally to a carriage assembly of a magnetic storage device, and more particularly to a carriage assembly having head-gimbal assemblies with asymmetrical swage bosses.

BACKGROUND

Magnetic storage devices, such as hard disk drives ("HDDs"), are widely used to store digital data or electronic information for enterprise data processing systems, computer workstations, portable computing devices, digital audio players, digital video players, and the like. Generally, HDDs include a carriage assembly that includes a head stack assembly and at least one head-gimbal assembly. The head stack assembly includes a plurality of carriage arms and a plurality of head-gimbal assemblies. Each one of the head-gimbal assemblies is attached to a corresponding one of the carriage arms by a process known as "swaging". Typically, during a swaging process, for each head-gimbal assembly, a swage ball is temporarily forced through a swage hole on a carriage arm, which causes a swage boss of the head-gimbal assembly, located within the swage hole, to plastically deform and form a radial interference fit with the swage hole to permanently attach the head-gimbal assembly to the carriage arm.

As the storage capacity and number of disks within a HDD has increased, head-gimbal assemblies with a lower profile swage boss have been utilized. However, such lower profile swage bosses have an increased risk of buckling during a swaging process, due to their lower profile, which can result in an insufficient radial interference fit. Additionally, robust swage attachment may require multi-pass swaging, using multiple swage balls or multiple passes by a single swage ball which is a time consuming and expensive process.

SUMMARY

The subject matter of the present application provides examples of carriage assemblies and associated methods and systems that overcome the above-discussed shortcomings of prior art techniques. The subject matter of the present application has been developed in response to the present state of the art, and in particular, in response to shortcomings of conventional carriage assemblies, methods, and systems.

Disclosed herein is a hard disk drive that comprises a housing, defining an interior cavity. The hard disk drive also comprises a plurality of magnetic disks within the interior cavity. The hard disk drive further comprises a carriage assembly, within the interior cavity and movable relative to the plurality of magnetic disks. The carriage assembly comprises a head stack assembly comprising a carriage arm. The carriage arm comprises a carriage-arm tip that comprises a swaging hole centered about a swaging axis and passing through the carriage-arm tip from a first side of the carriage-arm tip to a second side of the carriage-arm tip which is opposite the first side. The carriage assembly also comprises a first head-gimbal assembly comprising a tension baseplate on the first side of the carriage-arm tip and a tension swage boss located within the swaging hole. The tension swage boss is annular, is centered about the swaging axis, has a tension-boss inner diameter, and has a tension-boss outer diameter. The carriage assembly further comprises a second head-gimbal assembly comprising a compression baseplate on the second side of the carriage-arm tip. A compression swage boss is located within the swaging hole and spaced apart from the tension swage boss along the swaging axis. The compression swage boss is annular, is centered about the swaging axis, has a compression-boss inner diameter, and has a compression-boss outer diameter. The tension swage boss comprises an uppercut and a tension-boss undercut. The uppercut extends radially outward, away from the swaging axis, from a first backbore diameter to a second backbore diameter and has an uppercut depth, in a direction parallel to the swaging axis. The tension-boss undercut extends radially, away from the swaging axis, from the tension-boss outer diameter to a first undercut diameter and has a tension-boss undercut depth, in a direction parallel to the swaging axis. The compression swage boss comprises a compression-boss undercut. The compression-boss undercut extends radially outward, away from the swaging axis, from a compression-boss outer diameter to a second undercut diameter and has a compression-boss undercut depth, in a direction parallel to the swaging axis. A swaging ball is insertable through the swaging hole such that, as the swaging ball is inserted through the swaging hole, an interference fit is formed between an outer periphery of the tension swage boss and an inner periphery of the swaging hole and an outer periphery of the compression swage boss and the inner periphery of the swaging hole. The preceding subject matter of this paragraph characterizes example 1 of the present disclosure.

The tension swage boss converges, in a force direction along the swaging axis, from the second backbore diameter to the first backbore diameter and to the tension-boss inner diameter. The preceding subject matter of this paragraph characterizes example 2 of the present disclosure, wherein example 2 also includes the subject matter according to example 1, above.

The second backbore diameter of the tension baseplate is greater than the inner periphery of the swaging hole and the first backbore diameter of the tension baseplate is less than the inner periphery of the swaging hole. The preceding subject matter of this paragraph characterizes example 3 of the present disclosure, wherein example 3 also includes the subject matter according to any of examples 1-2, above.

The second backbore diameter of the tension baseplate is greater than the tension-boss outer diameter and the first backbore diameter of the tension baseplate is less than the tension-boss outer diameter. The preceding subject matter of this paragraph characterizes example 4 of the present disclosure, wherein example 4 also includes the subject matter according to any of examples 1-3, above.

The compression swage boss comprises a third backbore diameter. The third backbore diameter of the compression swage boss is less than the second backbore diameter of the tension swage boss. The preceding subject matter of this paragraph characterizes example 5 of the present disclosure, wherein example 5 also includes the subject matter according to any of examples 1-4, above.

A minimum thickness of the tension baseplate is less than a minimum thickness of the compression baseplate. The preceding subject matter of this paragraph characterizes example 6 of the present disclosure, wherein example 6 also includes the subject matter according to any of examples 1-5, above.

The compression-boss undercut depth is greater than the tension-boss undercut depth. The preceding subject matter of this paragraph characterizes example 7 of the present disclosure, wherein example 7 also includes the subject matter according to any of examples 1-6, above.

The tension baseplate has a tension baseplate thickness. The tension-boss undercut depth is less than 24 percent of a tension baseplate thickness. The preceding subject matter of this paragraph characterizes example 8 of the present disclosure, wherein example 8 also includes the subject matter according to of any examples 1-7, above.

The compression baseplate has a compression baseplate thickness. The compression-boss undercut depth is greater than 24 percent of the compression baseplate thickness. The preceding subject matter of this paragraph characterizes example 9 of the present disclosure, wherein example 9 also includes the subject matter according to of any examples 1-8, above.

The second undercut diameter is greater than the first undercut diameter. The preceding subject matter of this paragraph characterizes example 10 of the present disclosure, wherein example 10 also includes the subject matter according to any of examples 1-9, above.

The tension-boss inner diameter is less than the compression-boss inner diameter. The preceding subject matter of this paragraph characterizes example 11 of the present disclosure, wherein example 11 also includes the subject matter according to any of examples 1-10, above.

The tension-boss inner diameter is at least 0.02 mm less than the compression-boss inner diameter. The preceding subject matter of this paragraph characterizes example 12 of the present disclosure, wherein example 12 also includes the subject matter according to example 11, above.

A first height of the tension swage boss is equal to a second height of the compression swage boss. The first height and the second height are less than 0.2 mm. The preceding subject matter of this paragraph characterizes example 13 of the present disclosure, wherein example 13 also includes the subject matter according to any of examples 1-12, above.

The first height and the second height is 0.19 mm. The preceding subject matter of this paragraph characterizes example 14 of the present disclosure, wherein example 14 also includes the subject matter according to example 13, above.

The swaging ball has a ball diameter. The tension-boss inner diameter is between 4 percent and 15 percent smaller than the ball diameter. The preceding subject matter of this paragraph characterizes example 15 of the present disclosure, wherein example 15 also includes the subject matter according to any of examples 1-14, above.

The tension-boss inner diameter is between 5 percent and 8 percent smaller than the ball diameter. The preceding subject matter of this paragraph characterizes example 16 of the present disclosure, wherein example 16 also includes the subject matter according to example 15, above.

The plurality of magnetic disks comprises ten magnetic disks. The head stack assembly comprises nine carriage arms, each carriage arm sandwiched between a corresponding first head-gimbal assembly and a corresponding second head-gimbal assembly. The head stack assembly further comprises a top-most carriage arm, positioned above the nine carriage arms. The compression swage boss of a second head-gimbal assembly is located within the swaging hole of the carriage-arm tip of the top-most carriage arm. A bottom-most carriage arm is positioned below the nine carriage arms. The tension swage boss of a first head-gimbal assembly located within the swaging hole of the carriage-arm tip of the bottom-most carriage arm. The preceding subject matter of this paragraph characterizes example 17 of the present disclosure, wherein example 17 also includes the subject matter according to any of examples 1-17, above.

Further disclosed herein is a carriage assembly for a hard disk drive. The carriage assembly comprises a head stack assembly comprising a carriage arm. The carriage arm comprises a carriage-arm tip that comprises a swaging hole centered about a swaging axis and passing through the carriage-arm tip from a first side of the carriage-arm tip to a second side of the carriage-arm tip which is opposite the first side. The carriage arm also comprises a first head-gimbal assembly. The first head-gimbal assembly comprising a tension baseplate on the first side of the carriage-arm tip and a tension swage boss is located within the swaging hole. The tension swage boss is annular, is centered about the swaging axis, has a tension-boss inner diameter, and has a tension-boss outer diameter. The carriage arm further comprises a second head-gimbal assembly. The second head-gimbal assembly comprises a compression baseplate on the second side of the carriage-arm tip and a compression swage boss located within the swaging hole and spaced apart from the tension swage boss along the swaging axis. The compression swage boss is annular, is centered about the swaging axis, has a compression-boss inner diameter, and has a compression-boss outer diameter. The tension swage boss comprises an uppercut and a tension-boss undercut. The uppercut extends radially outward, away from the swaging axis, from a first backbore diameter to a second backbore diameter and has an uppercut depth, in a direction parallel to the swaging axis. The tension-boss undercut extends radially, away from the swaging axis, from the tension-boss outer diameter to a first undercut diameter and has a tension-boss undercut depth, in a direction parallel to the swaging axis. The compression swage boss comprises a compression-boss undercut. The compression-boss undercut extends radially outward, away from the swaging axis, from a compression-boss outer diameter to a second undercut diameter and has a compression-boss undercut depth, in a direction parallel to the swaging axis. A swaging ball is insertable through the swaging hole such that, as the swaging ball is inserted through the swaging hole, an interference fit is formed between an outer periphery of the tension swage boss and an inner periphery of the swaging hole and an outer periphery of the compression swage boss and the inner periphery of the swaging hole. The preceding subject matter of this paragraph characterizes example 18 of the present disclosure.

The head stack assembly comprises nine carriage arms, each carriage arm sandwiched between a corresponding first head-gimbal assembly and a corresponding second head-gimbal assembly. The head stack assembly further comprises a top-most carriage arm, positioned above the nine carriage arms. The compression swage boss of a second head-gimbal assembly located within the swaging hole of the carriage-arm tip of the top-most carriage arm. The head stack assembly also comprises a bottom-most carriage arm, positioned below the nine carriage arms. The tension swage boss of a first head-gimbal assembly located within the swaging hole of the carriage-arm tip of the bottom-most carriage arm. The preceding subject matter of this paragraph characterizes example 19 of the present disclosure, wherein example 19 also includes the subject matter according to example 18, above.

The compression swage boss comprises a compression-boss undercut. The compression-boss undercut extends radially outward, away from the swaging axis, from the compression-boss outer diameter to a second undercut diameter and has a compression-boss undercut depth, in a direction parallel to the swaging axis. The preceding subject matter of this paragraph characterizes example 20 of the present disclosure, wherein example 20 also includes the subject matter according to examples 18 or 19, above.

Additionally, disclosed herein is a method of coupling a head-gimbal assembly to a carriage arm. The method comprises positioning a tension baseplate of a first head-gimbal assembly on a carriage-arm tip of a carriage arm. A tension swage boss is located within a swaging hole, on the carriage-arm tip and concentric with a swaging axis of the swaging hole. The method also comprises positioning a compression baseplate of a second head-gimbal assembly on a carriage arm tip of a carriage arm. The carriage arm tip is sandwiched between the tension baseplate and the compression baseplate. A compression swage boss located within the swaging hole and concentric with the swaging axis of the swaging hole and the compression swage boss spaced apart from the tension swage boss along the swaging axis. The method further comprises inserting a swaging ball axially through the swaging hole in an insertion direction and plastically deforming the tension swage boss and the compression swage boss to form an interference fit between an outer periphery of the tension swage boss against an inner periphery of the swaging hole and an interference fit between an outer periphery of the compression swage boss against the inner periphery of the swaging hole. The tension swage boss comprises an uppercut and a tension-boss undercut. The uppercut extends radially outward, away from the swaging axis, from a first backbore diameter to a second backbore diameter and has an uppercut depth, in a direction parallel to the swaging axis. The tension-boss undercut extends radially, away from the swaging axis, from the tension-boss outer diameter to a first undercut diameter and has a tension-boss undercut depth, in a direction parallel to the swaging axis. The compression swage boss comprises a compression-boss undercut. The compression-boss undercut extends radially outward, away from the swaging axis, from a compression-boss outer diameter to a second undercut diameter and has a compression-boss undercut depth, in a direction parallel to the swaging axis. The preceding subject matter of this paragraph characterizes example 21 of the present disclosure.

The described features, structures, advantages, and/or characteristics of the subject matter of the present disclosure may be combined in any suitable manner in one or more examples, including embodiments and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example, embodiment, or implementation. In other instances, additional features and advantages may be recognized in certain examples, embodiments, and/or implementations that may not be present in all examples, embodiments, or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Figure 1:
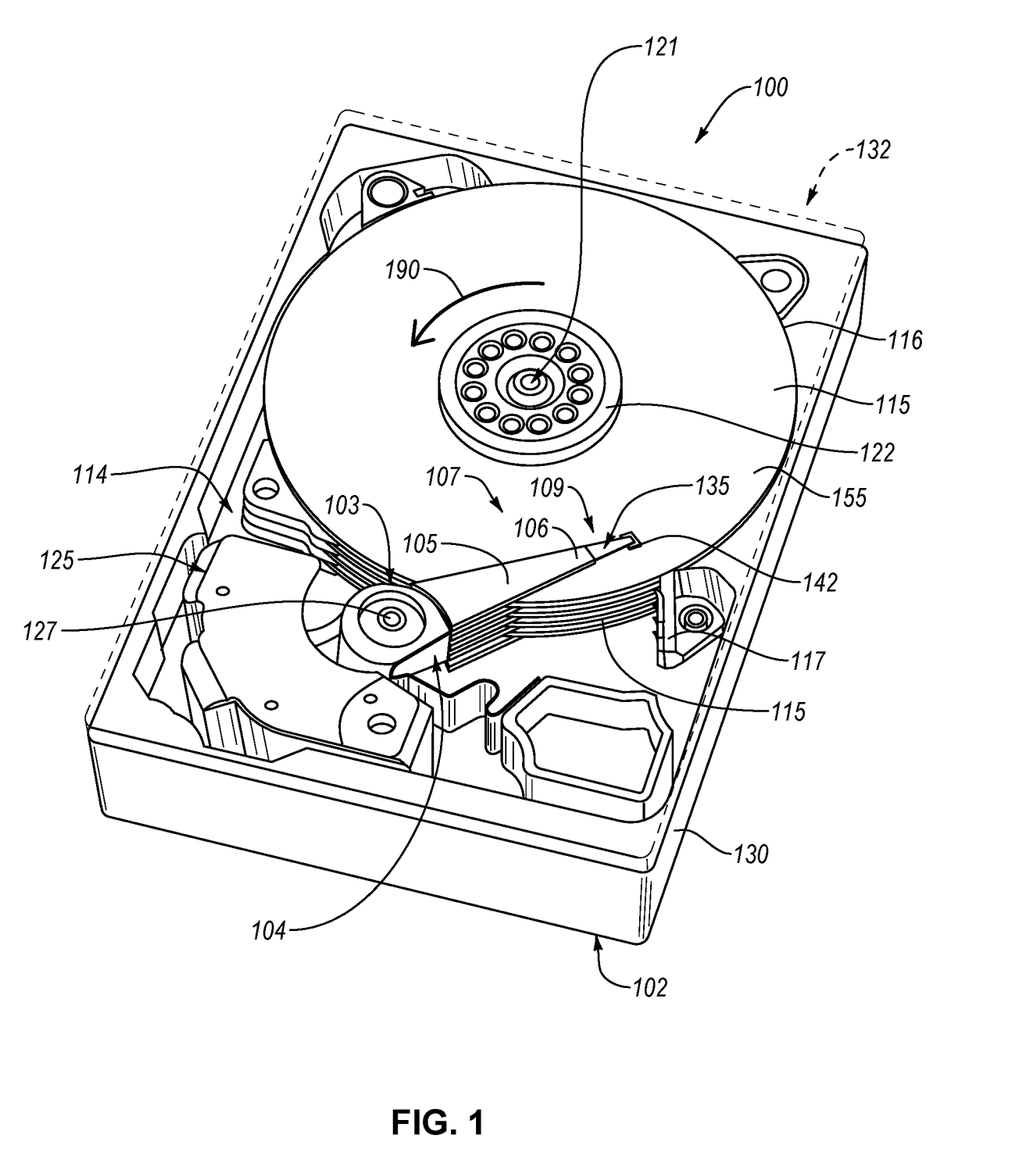
FIG. 1 is a schematic perspective view of a magnetic storage device, according to one or more examples of the present disclosure.

Referring to FIG. 1, a magnetic storage device 100, according to one example, is depicted as a hard disk drive (HDD). However, in other examples, the magnetic storage device 100 can be any of various magnetic storage devices without departing from the essence of the subject matter of the present disclosure. The magnetic storage device 100 includes a housing 102 that seals or encloses an interior cavity 114 defined within the housing 102. The housing 102 includes a base 130 and a cover 132 (shown in dashed lines so as not to obscure internal features of the magnetic storage device 100 within the interior cavity 114 of the housing 102). The cover 132 is coupled to the base 130 to enclose the interior cavity 114 from the environment exterior to the housing 102. In some examples, a seal or gasket is positioned between the base 130 and the cover 132 to promote a seal between the base 130 and the cover 132.

The magnetic storage device 100 includes various features located within the interior cavity 114 of the housing 102. In some examples, the magnetic storage device 100 includes a carriage assembly 103, disks 115, a spindle motor 121, and a voice coil motor (VCM) 125 within the interior cavity 114. The carriage assembly 103 includes a head stack assembly 107 that includes a plurality of carriage arms 105 and at least one head-gimbal assembly 109 (e.g., suspension) coupled to a carriage-arm tip 106 (e.g., distal tip) of each carriage arm 105 of the plurality of carriage arms 105. Each head-gimbal assembly 109 includes a suspension assembly 135 and a slider 142. The slider 142 includes at least one read-write head coupled to (e.g., embedded in) the slider 142. Although the magnetic storage device 100 in FIG. 1 is shown to have five carriage arms 105 and four disks 115, in other examples the magnetic storage device 100 can have fewer or more than five carriage arms 105 (e.g., eleven carriage arms 105) or fewer or more than four disks 115 (e.g., ten disks 115). In one example, each side of each carriage arm 105 facing a disk 115 has a head-gimbal assembly 109 (e.g., each of bottom and top carriage arms 105 has one head-gimbal assembly 109 and each of middle carriage arms 105, which are between two of the disks 115 and between the bottom and top carriage arms 105, have two head-gimbal assemblies 109). Similarly, although the magnetic storage device 100 is shown to have one spindle motor 121 and one VCM 125, in other examples, the magnetic storage device 100 can have any number of spindle motors 121 and VCMs 125.

The spindle motor 121 is coupled to the base 130. Generally, the spindle motor 121 includes a stationary portion non-movably fixed relative to the base 130 and a spindle that is rotatable relative to the stationary portion and the base 130. Accordingly, the spindle of the spindle motor 121 can be considered to be part of or integral with the spindle motor. Generally, the spindle motor 121 is operable to rotate the spindle relative to the base 130. The disks 115, or platters, are co-rotatably fixed to the spindle of the spindle motor 121 via respective hubs 122, which are co-rotatably secured to respective disks 115 and the spindle. As the spindle of the spindle motor 121 rotates, the disks 115 correspondingly rotate. In this manner, the spindle of the spindle motor 121 defines a rotational axis of each disk 115. The spindle motor 121 can be operatively controlled to rotate the disks 115, in a rotational direction 190, a controlled amount at a controlled rate.

Each of the disks 115 may be any of various types of magnetic recording media. Generally, in one example, each disk 115 includes a substrate and a magnetic material applied directly or indirectly onto the substrate. For example, the magnetic material of the disks 115 may be conventional granular magnetic recording disks or wafers that have magnetic layer bits with multiple magnetic grains on each bit. In granular magnetic media, all of the bits are co-planar and the surface 116 of the disk is substantially smooth and continuous. In one example, each bit has a magnetic dipole moment that can either have an in-plane (longitudinal) orientation or an out-of-plane (perpendicular) orientation.

As the disks 115 rotate in a read-write mode, the VCM 125 electromagnetically engages voice coils of the carriage arms 105 to rotate the carriage arms 105, and the head-gimbal assemblies 109, which are coupled to the carriage arms 105, relative to the disks 115 in a rotational direction along a plane parallel to read-write surfaces 155 of the disks 115. The carriage arms 105 can be rotated to position the read-write head of the head-gimbal assemblies 109 over a specified radial area of the read-write surface 155 of a corresponding disk 115 for read and/or write operations. The VCM 125 is fixed to the base 130 in engagement with the voice coils of the carriage arms 105, which are rotatably coupled to the base 130 via a spindle 127 extending through the carriage assembly 103. Generally, the spindle 127 defines a rotational axis about which the carriage arms 105 rotate when actuated by the VCM 125.

The carriage arms 105 are non-movably fixed to (e.g., integrally formed as a one-piece unitary monolithic body) and extend away from a base of the carriage assembly 103 in a spaced-apart manner relative to each other. In some examples, the carriage arms 105 are spaced an equi-distance apart from each other and extend parallel relative to each other. A respective one of the disks 115 is positioned between adjacent carriage arms 105. In an idle mode (e.g., when read-write operations are not being performed), the VCM 125 is actuated to rotate the carriage arms 105, in a radially outward direction relative to the disks 115, such that the head-gimbal assemblies 109 are parked or unloaded onto a ramp support 117 secured to the base 130.

Figure 2:
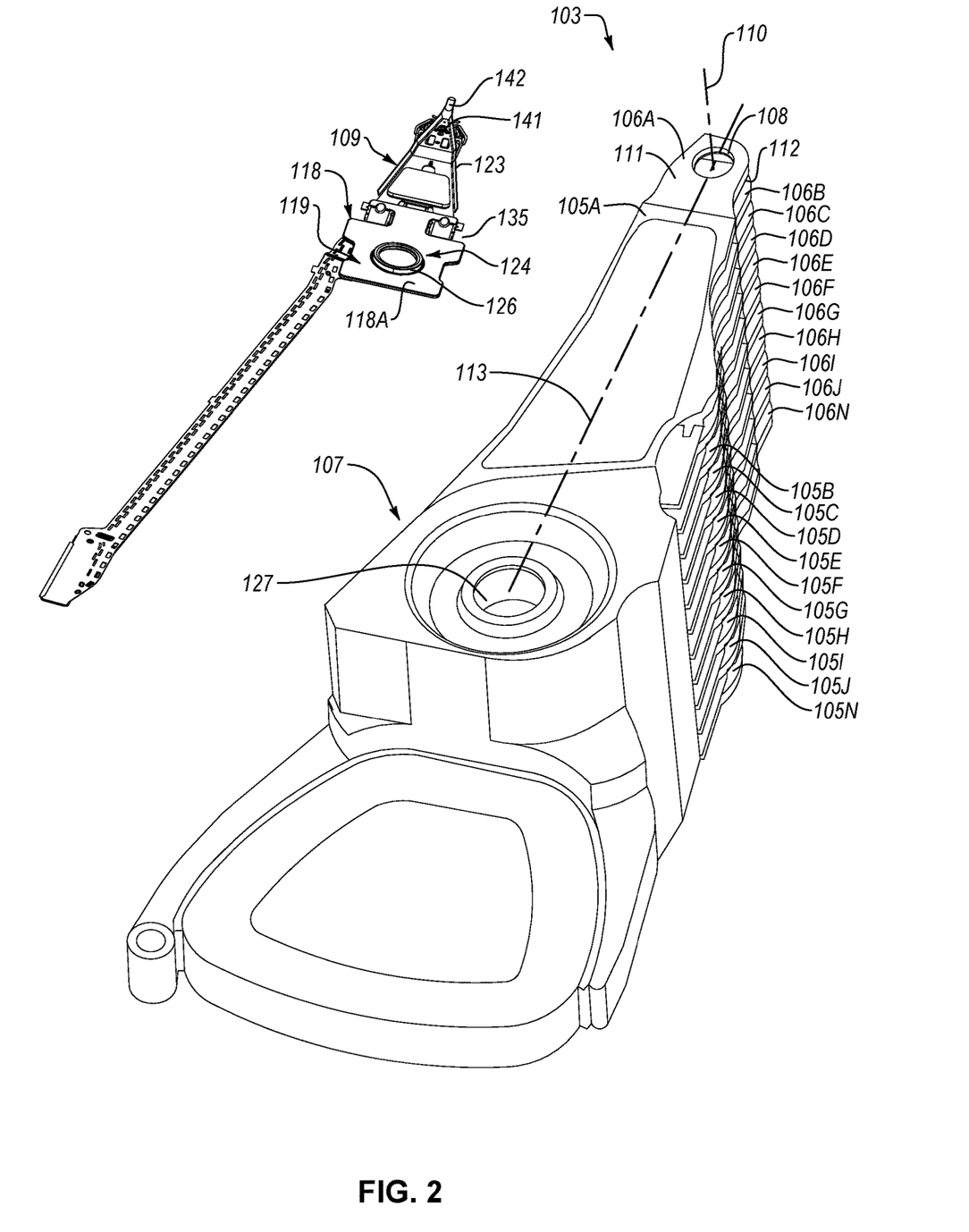
FIG. 2 is a schematic perspective view of a head stack assembly and a head-gimbal assembly of the magnetic storage device, according to one or more examples of the present disclosure.

As shown in FIG. 2, another example of a carriage assembly 103 is shown. The carriage assembly 103 includes the head stack assembly 107, which includes carriage arms 105A-N, each having a corresponding one of a plurality of carriage-arm tips 106A-N, and a plurality of head-gimbal assemblies 109. For the sake of simplicity, only one head-gimbal assembly 109 of the plurality of head-gimbal assemblies 109 is illustrated and it is shown in exploded view adjacent to the carriage arms 105A-N. However, it is noted that each one of the carriage arms 105A-N may have another head-gimbal assembly 109 on an opposite side of the carriage arm 105, that mirrors the head-gimbal assembly 109 shown (see, e.g., FIG. 3A). In some examples, only one head-gimbal assembly 109 is coupled to each one of the carriage-arm tip 106A of the carriage arm 105A and the carriage-arm tip 106N of the carriage arm 105N, and two head-gimbal assemblies 109 are coupled to each one of the carriage-arm tips 106B-J of the carriage arms 105B-J. In the current reference number nomenclature, 'N' represents any whole number to indicate that the carriage assembly 103 can have any whole number of corresponding features without departing from the essence of the present disclosure.

As shown in FIG. 2, the head stack assembly 107 includes eleven carriage arms 105A-N. However, in other examples, the head stack assembly 107 can have fewer or more than eleven carriage arms. The head stack assembly 107 of FIG. 2 includes a top-most carriage arm 105A, nine middle carriage arms 105B-J, and a bottom-most carriage arm 105N. Each of the carriage arms 105A-N has a carriage-arm tip at the distal region of the carriage arm. More specifically, the top-most carriage arm 105A has a top-most carriage-arm tip 106A, each one of the nine middle carriage arms 105B-J has a carriage-arm tip 106B-J, and the bottom-most carriage arm 105N has a carriage-arm tip 106N. Each one of the carriage-arm tips 106A-N includes a swaging hole 108 that passes through the carriage-arm tip from a first side 111 of the carriage-arm tip to a second side 112 of the carriage-arm tip, where the second side 112 is opposite the first side 111. The swaging hole 108 is centered about a swaging axis 110 which is perpendicular relative to an arm axis 113, parallel to a length of each one of the plurality of carriage arm 105A-N.

Each one of the head-gimbal assemblies 109 includes a baseplate 118, a load beam 123, and a flexure 141. The baseplate 118 is utilized to directly interconnect the carriage arm 105 and the load beam 123. More specifically, the baseplate 118 spans between and couples together the carriage-arm tip 106 of the carriage arm 105 and the load beam 123. The baseplate 118 has a flange 119 and a swage boss 124, protruding from the flange 119. The flange 119 is a relatively flat plate and the swage boss 124 has an annular shape. The slider 142, with at least one read-write head, is coupled to a distal end portion of the load beam 123 via a tip portion of the flexure 141.

In one example, the baseplate 118 of the head-gimbal assembly 109 is a compression baseplate 118A and configured to be coupled to the second side 112 of a corresponding one of the carriage arms 105A-N. Accordingly, the swage boss 124 of the compression baseplate 118A is a compression swage boss 126 that is configured to protrude upwards into the swaging hole 108 from the second side 112 of the corresponding one of the carriage arms 105A-N. In another example, the head-gimbal assembly 109 has a tension baseplate 118B (see, e.g., FIG. 3A) that is configured to be coupled to the first side 111 of a corresponding one of the carriage arms 105A-N. Accordingly, the tension baseplate 1118B has a swage boss 124 that is a tension swage boss 128 that is configured to protrude downwards into the swaging hole 108 on a corresponding one of the carriage arms 105A-N.

Figure 3A:
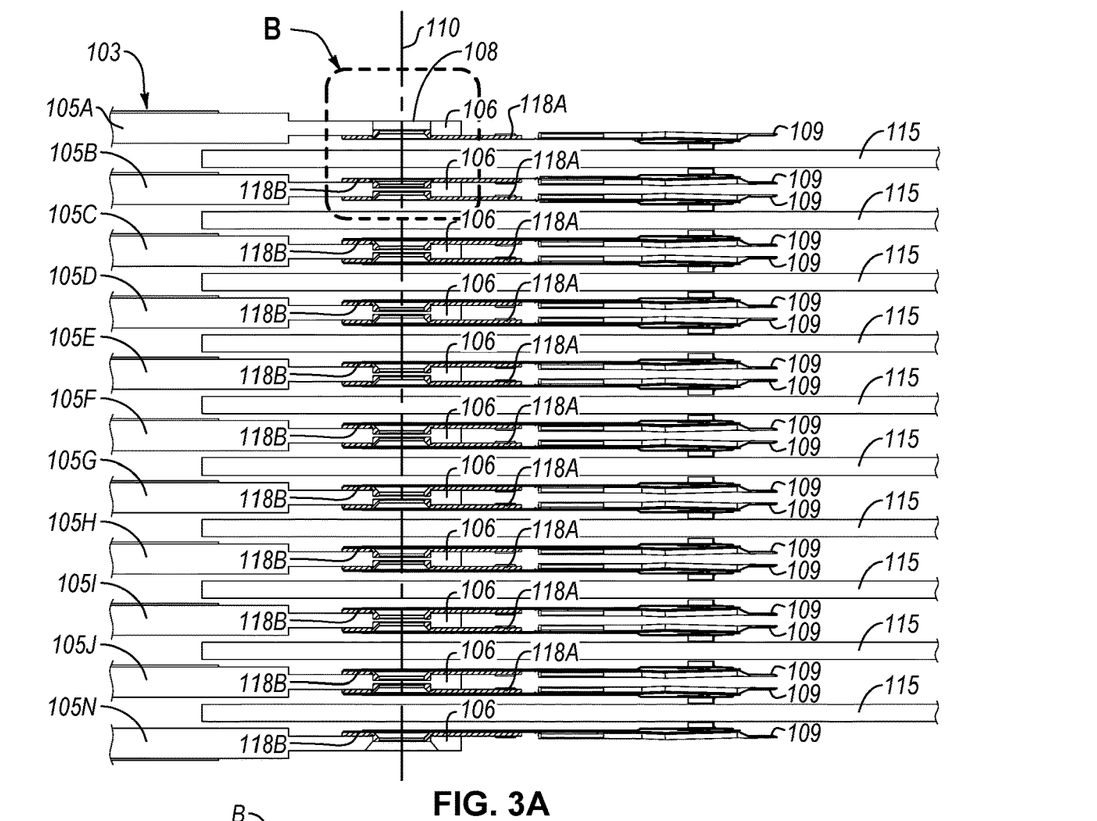
FIG. 3A is a schematic side view of a portion of the head stack assembly, a plurality of disks positioned between adjacent carriage arms of the head stack assembly, according to one or more examples of the present disclosure.
Figure 3B:
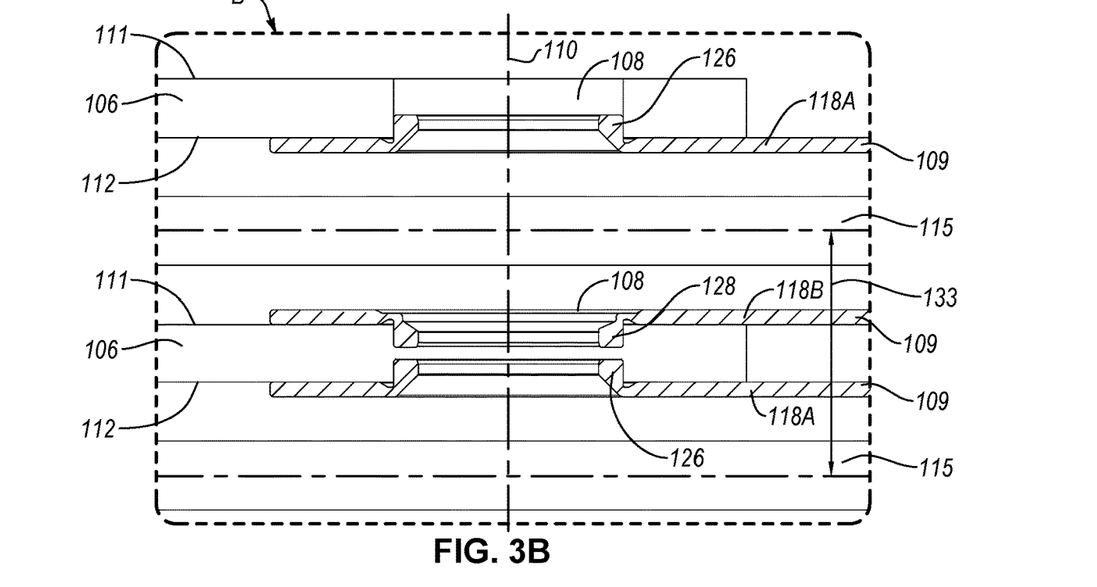
FIG. 3B is a schematic side view of Box B of the head stack assembly of FIG. 3A, according to one or more examples of the present disclosure.

A side, elevation view of a portion of one example of the carriage assembly 103, after a swaging process, is shown in FIGS. 3A and 3B. The top-most carriage arm 105A is coupled (i.e. swaged) to a single one of the plurality of head-gimbal assemblies 109. The head-gimbal assembly 109 swaged to the carriage arm 105A includes a compression baseplate 118A. The compression baseplate 118A includes a compression swage boss 126 that is located within and protrudes upwards into the swaging hole 108 from the second side 112 of the carriage-arm tip 106A of the carriage arm 105A. The compression baseplate 118A is annular and centered about the swaging axis 110. Likewise, the bottom-most carriage arm 105N is coupled (i.e., swaged) to one head-gimbal assembly 109. The head-gimbal assembly 109 swaged to the carriage arm 105N includes a tension baseplate 118B. The tension baseplate 118B includes a tension swage boss 128 that is located within and protrudes downwards into the swaging hole 108 from the first side 111 of the carriage-arm tip 106N of the carriage arm 105N. The tension baseplate 118B is annular and centered about the swaging axis 110. Each one of the middle carriage arms 105B-J is coupled to two of the head-gimbal assemblies 109. Accordingly, each one of the middle carriage arms 105B-J is coupled to a first head-gimbal assembly 109, having a tension baseplate 118B and a tension swage boss 128, and a second head-gimbal assembly 109, having a compression baseplate 118A and a compression swage boss 126.

A respective one of the plurality of disks 115 is positioned between adjacent corresponding carriage arms 105A-N, such that ten disks 115 are shown positioned between the eleven carriage arms 105A-N. As shown in FIG. 3B, the disks 115 are spaced apart from each other by a distance defined as a disk pitch 133. The disk pitch 133 is measured parallel to the swaging axis 110, from a midpoint of a first disk 115 to the midpoint of a second adjacent disk 115. In one example, in order to increase the number of disks 115 that can fit within a universally sized magnetic storage device 100, without increasing the space within the interior cavity 114, the disk pitch 133 can be decreased. In other words, the distance between each disk 115 can be shortened to allow more disks 115 within a magnetic storage device 100 having the same sized interior cavity 114 as previous designs. In some examples, in order to shorten the disk pitch 133 a lower profile swage boss 124 can be used.

Figure 4:
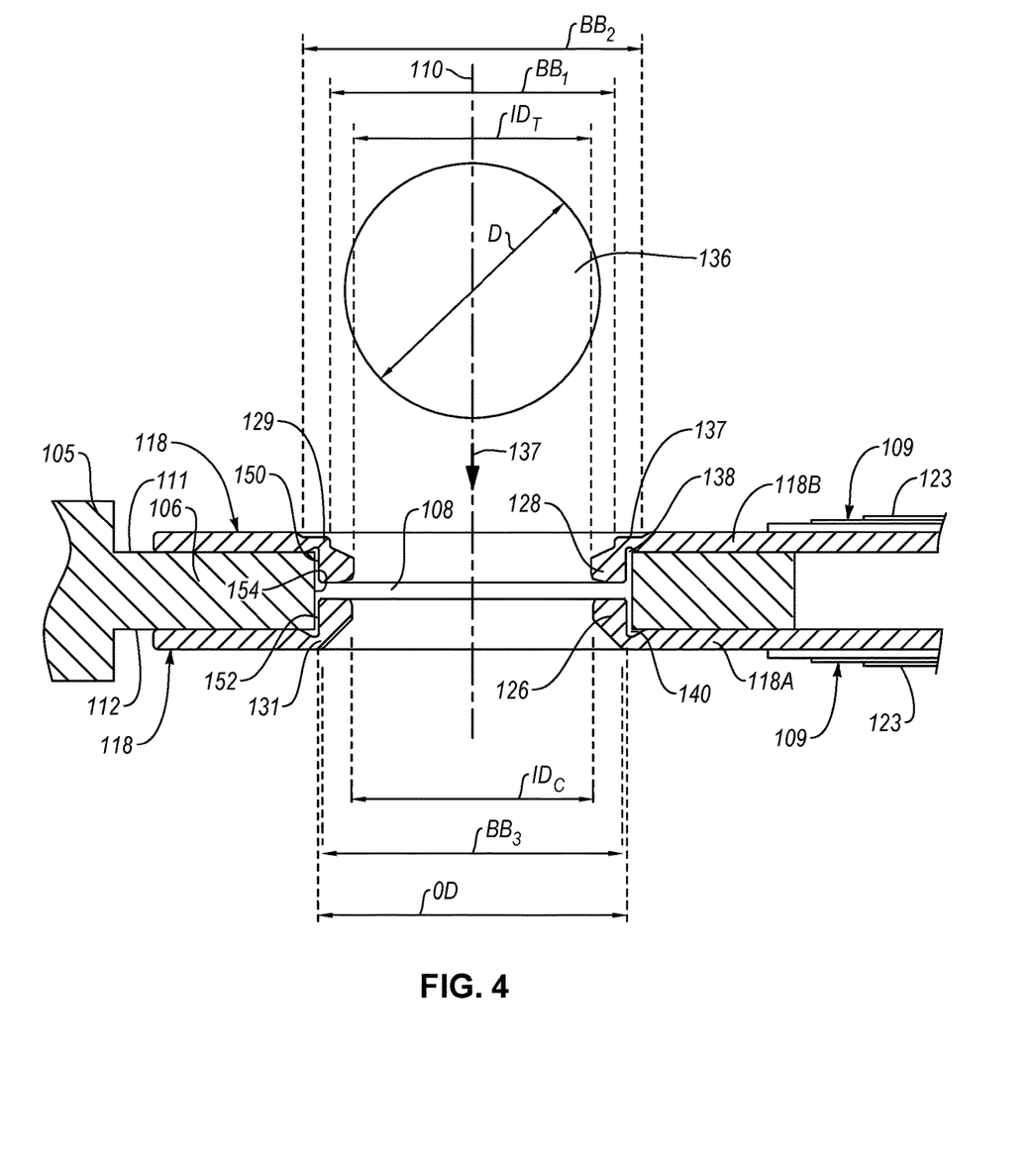
FIG. 4 is a schematic cross-sectional view of a carriage-arm tip and two head-gimbal assemblies, before swaging, according to one or more examples of the present disclosure.
Figure 5:
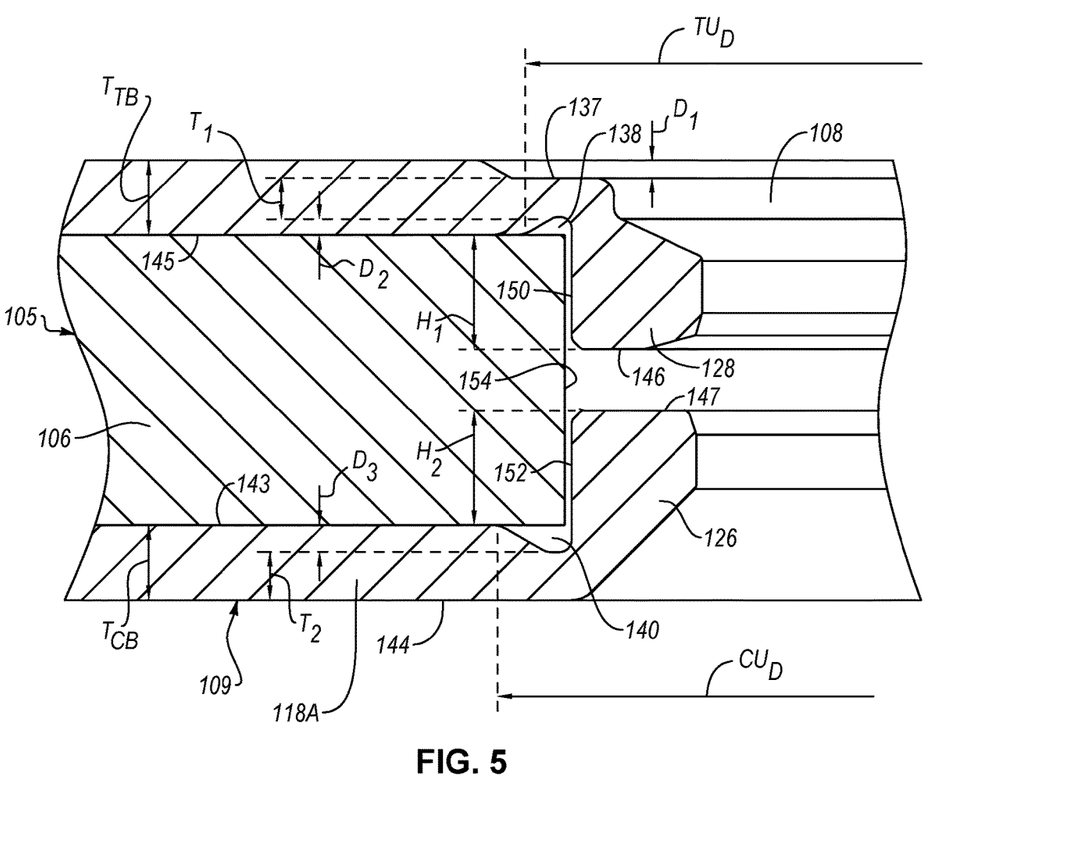
FIG. 5 is a schematic cross-sectional view of the carriage-arm tip and the two head-gimbal assemblies, before swaging, according to one or more examples of the present disclosure.

Referring to FIG. 4 and FIG. 5 is a cross-sectional view of the carriage-arm tip 106 of the carriage arm 105 and two head-gimbal assemblies 109 with asymmetrical swage bosses, prior to swaging. Each one of the head-gimbal assemblies 109 includes a load beam 123 and a baseplate 118. The first head-gimbal assembly 109 has a tension baseplate 118B on the first side 111 of the carriage arm 105. The tension swage boss 128 is located within the swaging hole 108 on the carriage-arm tip 106 and extends from the first side 111 of the carriage-arm tip 106 into the swaging hole 108. The swaging hole 108 is centered about the swaging axis 110 and the tension swage boss 128 is annular about the swaging axis 110. The tension swage boss 128 has a tension-boss inner diameter $ID_T$ and a tension-boss outer diameter OD.

Additionally, the second head-gimbal assembly 109 has a compression baseplate 118A on the second side 112 of the carriage arm 105. The compression swage boss 126 is located within the swaging hole 108 on the carriage-arm tip 106 and extends from the second side 112 of the carriage-arm tip 106 into the swaging hole 108. The compression swage boss 126 is also annular about the swaging axis 110. The compression swage boss 126 has a compression-boss inner diameter $ID_C$ and a compression-boss outer diameter OD. In one example, the carriage-arm tip 106 has a thickness such that the tension swage boss 128 and the compression swage boss 126 are spaced apart from each other (i.e., not in contact with each other). The tension swage boss 128 and the compression swage boss 126 are made of stainless steel, in one example.

In certain examples, the tension-boss inner diameter $ID_T$ and the compression-boss inner diameter $ID_C$ are equal. For example, the tension-boss inner diameter $ID_T$ and compression-boss inner diameter $ID_C$ can both be equal to or less than 1.51 mm. Alternatively, in some examples, the tension-boss inner diameter $ID_T$ and the compression-boss inner diameter $ID_C$ are not equal. For example, the tension-boss inner diameter $ID_T$ can be less than the compression-boss inner diameter $ID_C$. In one example, the tension-boss inner diameter $ID_T$ is at least 0.02 mm less than the compression-boss inner diameter $ID_C$. In yet another example, the tension-boss inner diameter $ID_T$ is equal to or less than 1.49 mm and the compression-boss inner diameter $ID_C$ is equal to or less than 1.51 mm. In some examples, the tension-boss outer diameter OD is equal to the compression-boss outer diameter OD.

The tension swage boss 128 includes an uppercut 137 and a tension-boss undercut 138. The uppercut 137 extends radially outward, away from the swaging axis 110, from a first backbore diameter $BB_1$ to a second backbore diameter $BB_2$. In other words, the tension swage boss 128 converges, in the force direction 137 along the swaging axis 110, from the second backbore diameter $BB_2$ to the first backbore diameter $BB_1$ and to the tension-boss inner diameter $ID_T$. In one example, the second backbore diameter $BB_2$ of the tension baseplate 118B is greater than the inner periphery 154 of the swaging hole 108 and the first backbore diameter $BB_1$ of the tension baseplate 118B is less than the inner periphery 154 of the swaging hole 108. In another example, the second backbore diameter $BB_2$ of the tension baseplate 118B is greater than the tension-boss outer diameter OD and the first backbore diameter $BB_1$ of the tension baseplate 118B is less than the tension-boss outer diameter OD. The uppercut 137 has an uppercut depth $D_1$ in a direction parallel to the swaging axis 110.

The tension-boss undercut 138 extends radially, away from the swaging axis 110, from the tension-boss outer diameter OD to a first undercut diameter $TU_D$. The tension-boss undercut 138 has a tension-boss undercut depth $D_2$ in a direction parallel to the swaging axis 110.

The portion of the tension swage boss 128 between the first backbore $BB_1$ and the tension-boss outer diameter OD defines a neck 129 of the tension swage boss 128. During swaging, the tension swage boss 128 can rotate at the neck 129 (see, e.g., FIG. 7).

The compression swage boss 126 also includes a compression-boss undercut 140. The compression-boss undercut 140 extends radially outward, away from the swaging axis 110, from a compression-boss outer diameter OD to a second undercut diameter $CU_D$. The compression-boss undercut 140 has a compression-boss undercut depth $D_3$ in a direction parallel to the swaging axis 110. In one example, the compression undercut depth $D_3$ is greater than the tension undercut depth $D_2$.

The tension baseplate 118B has a tension baseplate thickness $T_{TB}$. In one example, the tension-boss undercut depth $D_2$ is less than 50 percent of the tension baseplate thickness $T_{TB}$. In another example, the tension-boss undercut depth $D_2$ is less than 24 percent of the tension baseplate thickness $T_{TB}$. In yet another example, the tension-boss undercut depth $D_2$ is between 24 and 50 percent of the tension baseplate thickness $T_{TB}$. The compression baseplate 118A has a compression baseplate thickness $T_{CB}$. In another example, the compression-boss undercut depth $D_3$ is greater than 50 percent of the compression baseplate thickness $T_{CB}$. In yet another example, the compression-boss undercut depth $D_3$ is greater than 24 percent of the compression baseplate thickness $T_{CB}$. In yet another example, the compression-boss undercut depth $D_3$ is between 24 and 50 percent of the compression baseplate thickness $T_{CB}$. In some examples, the compression undercut depth $D_3$ is at least 1.5 times larger than the tension undercut depth $D_2$. In yet another example, the compression undercut diameter $CU_D$ is greater than the tension undercut diameter $TU_D$.

The compression swage boss 126 also includes a third backbore diameter $BB_3$. The portion of the compression swage boss 126 between the third backbore $BB_3$ and the compression-boss outer diameter OD defines a neck 131 of the compression swage boss 126. During swaging, the compression swage boss 126 can both rotate and expand at the neck 131 (see, e.g., FIG. 7). In one example, the second backbore diameter $BB_2$ of the tension swage boss 128 is greater than the third backbore diameter $BB_3$ of the compression swage boss 126.

The tension baseplate 118B has a minimum thickness $T_1$, that extends from the uppercut 137 to the tension-boss undercut 138. The compression baseplate 118A also has a minimum thickness $T_2$, extending from an outer surface 144 of the compression baseplate 118A to the compression-boss undercut 140. In one example, the minimum thickness $T_1$ of the tension baseplate 118B is less than the minimum thickness $T_2$ of the compression baseplate 118A.

The tension swage boss 128 has a first height $H_1$ extending from an inner surface 145 of the tension baseplate 118B to a tension-boss inner surface 146. The compression swage boss 126 has a second height $H_2$, extending from an inner surface 143 of the compression baseplate 118A to a compression-boss inner surface 147. In one example, the first height $H_1$ and the second height $H_2$ are equal. For example, the first height $H_1$ and the second height $H_2$ are less than 0.2 mm. In other examples, the first height $H_1$ and the second height $H_2$ are 0.19 mm. In yet other examples, the first height $H_1$ and the second height $H_2$ are not equal. The first height $H_1$ and the second height $H_2$ are a factor for determining how many disks 115 can fit within the magnetic storage device 100. Accordingly, the first height $H_1$ and the second $H_2$ are of sufficient height to avoid excessive buckling of the swage boss 124, resulting in a poor interference fit of the swage boss 124 and the carriage-arm tip 106, while allowing a greater number of disks 115 to fit within the magnetic storage device 100.

A swaging ball 136 is insertable into the swaging hole 108. During the swaging process, the swaging ball 136 having a diameter D large enough to interfere with the tension-boss inner diameter $ID_T$ and the compression-boss inner diameter $ID_C$, is forced through the tension swage boss 128 and the compression swage boss 126 located within the corresponding swaging hole 108. In one example, the tension-boss inner diameter $ID_T$ is between 4 percent to 15 percent smaller than the ball diameter D. Likewise, in some examples, the compression-boss inner diameter $ID_C$ is between 4 percent and 15 percent smaller than the ball diameter D. In another example, the tension-boss inner diameter $ID_T$ is between 5 percent to 8 percent smaller than the ball diameter D.

During the swaging process, the swaging ball 136 is forced through the swaging hole 108 and an interference fit is formed between an outer periphery 150 of the tension swage boss 128 (e.g., the portion of the tension swage boss 128 defining the tension-boss outer diameter OD) and an inner periphery of the swaging hole 108. Additionally, an interference fit is formed between an outer periphery 152 of the compression swage boss 126 (e.g., the portion of the compression swage boss 126 defining the compression-boss outer diameter OD) and the inner periphery 154 of the swaging hole 108. In one example, the swaging ball 136 is forced in a force direction 137, parallel to the swaging axis 110, through the swaging hole 108. After swaging, the outer periphery 150 of the tension swage boss 128 and the outer periphery 152 of the compression swage boss 126 tightly engages and is radially preloaded against the inner periphery 154 of the corresponding swaging hole 108 in the carriage-arm tip 106.

Figure 6:
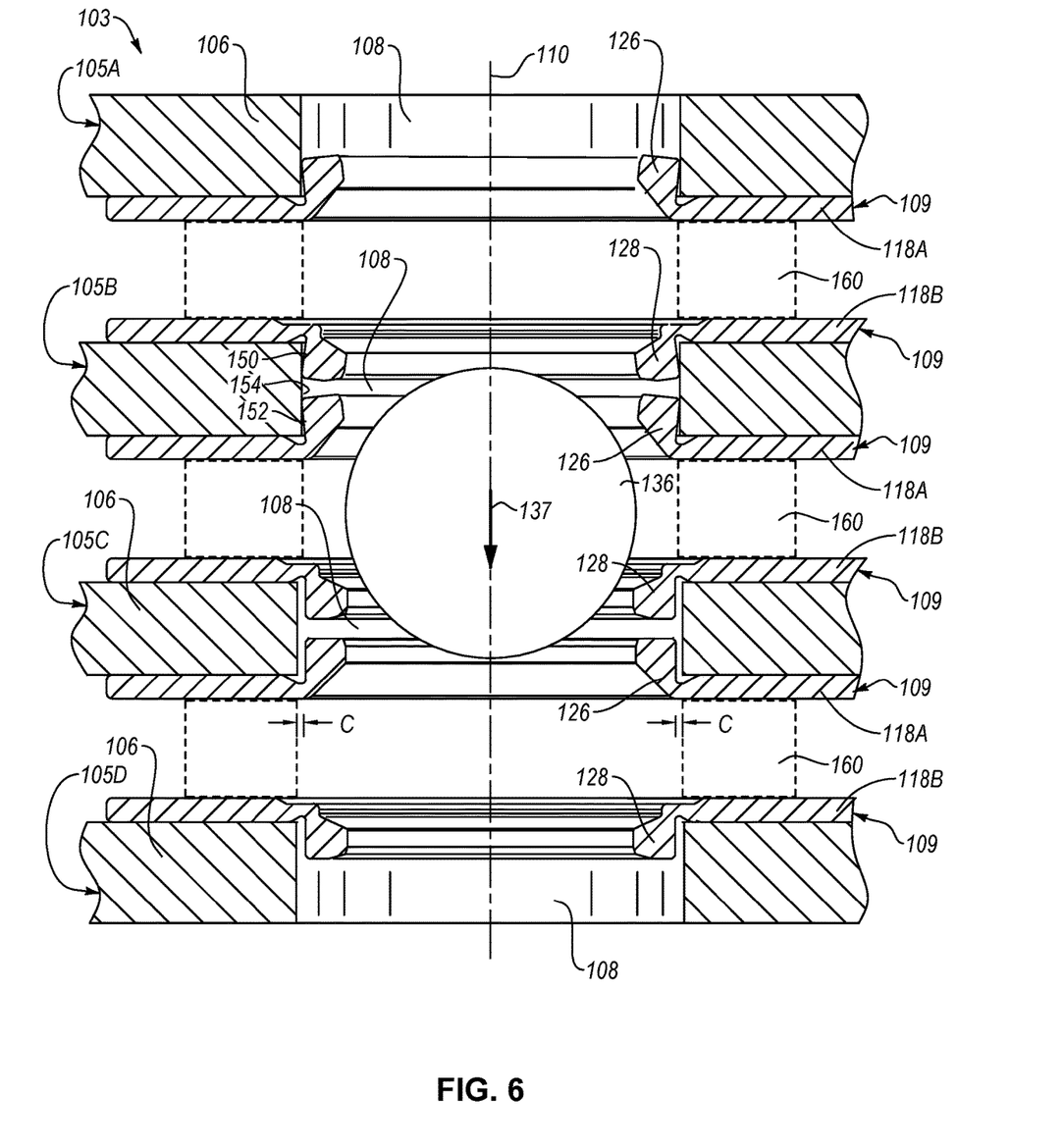
FIG. 6 is a schematic cross-sectional view of a portion of a carriage assembly during swaging, according to one or more examples of the present disclosure.

Referring to FIG. 6 is a cross-sectional view of a portion of the carriage assembly 103 during swaging, according to one example. The carriage assembly 103 includes a top-most carriage arm 105A, two middle carriage arms 105B and 105C, and a bottom-most carriage arm 105D. The carriage assembly 103 further includes six head-gimbal assemblies 109, in the process of being coupled, by swaging, to the corresponding carriage arm 105.

During the swaging process, the swaging ball 136 is forced axially through the plurality of swaging holes 108 in the force direction 137. In one example, the swaging ball 136 is forced in the force direction 137 by a tool, not shown, that forces the swaging ball 136 in the force direction 137 through the plurality of swaging holes 108. In some examples, additional tools may be used to help control the motion of the swaging ball 136 during the swaging process. Comb spacer tools 160 may be temporarily positioned between the carriage arm 105A, 105B, 105C, and 105D, respectively, to limit axial carriage arm deflection caused by the force applied in the force direction 137.

The passing of the swaging ball 136 through the swaging hole 108 causes the tension swage boss 128 and/or compression swage boss 126 to plastically deform within the corresponding swaging hole 108 and cause an interference fit with the corresponding swaging hole 108. For example, the swaging ball 136 has been forced axially through the swaging hole 108 in carriage arm 105A and 105B, such that each of the swage bosses with the swaging holes 108 have formed an interference fit with the corresponding swaging hole 108. Accordingly, the compression swage boss 126 has formed an interference fit with the carriage arm 105A and the tension swage boss 128 and the compression swage boss 126 has formed an interference fit with the carriage arm 105B. By contrast, the swaging ball 136 has not yet been forced axially through the swaging hole 108 in carriage arms 105C and 105D. Therefore, a radial clearance C exists between the inner periphery 154 of the swaging hole 108 and the corresponding swage bosses in carriage arms 105C and 105D.

In some examples, the swaging process is performed with a single swaging ball 136 and a single pass through the carriage assembly. Multi-pass swaging, where the necessary total radial plastic deformation is created by swaging more than one time with progressively larger swage balls and/or by forcing the swage ball(s) through the swage holes in alternative directions, can be a time consuming and an expensive process. Accordingly, obtaining a good interference fit using a single swage boss and a single pass is preferred in some instances.

Figure 7:
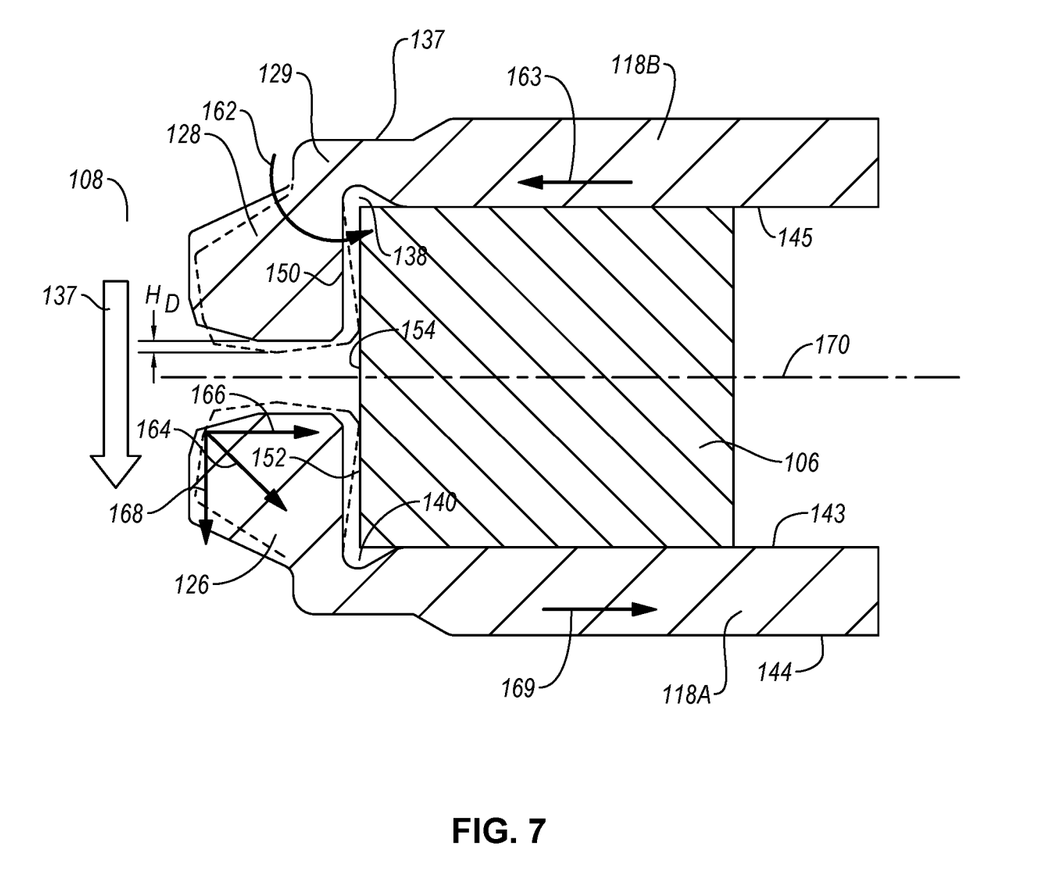
FIG. 7 is a schematic cross-sectional view of a carriage-arm tip and two head-gimbal assemblies, according to one or more examples of the present disclosure.

Referring to FIG. 7, a cross-sectional view of the carriage-arm tip 106 and two head-gimbal assemblies 109 is shown. During swaging, a number of forces are generated in the head-gimbal assemblies 109 and the carriage-arm tip 106. In order to avoid a poor interference fit between the swage bosses and the carriage-arm tip 106 from forces such as excessive buckling, baseplate deformation, carriage-arm tip deformation, and residual stress within the carriage-arm tip, it can be beneficial to balance the forces during the swaging process. Accordingly, the tension swage boss 128 and the compression swage boss 126 have asymmetrical profiles, such that the stresses along axis 170, perpendicular to the swaging axis 110 are symmetrical during swaging. Symmetrical stress along axis 170 can minimize the carriage-arm tip 106 deformation, as well as, the baseplate deformation in the tension baseplate 118B and the compression baseplate 118A.

During the swaging process, the tension swage boss 128 rotates, along a rotation axis 162 at the neck 129 of the tension swage boss 128. The rotation of the neck 129 causes the outer periphery 150 of the tension swage boss 128 to tightly engage (i.e., clamp) with the inner periphery 154 of the swaging hole 108. The rotation along the rotation axis 162 causes the tension swage boss 128 to deform at an angle and downward, in a direction towards the axis 170, to a maximum deformation height HD. In one example, the maximum deformation height HD does not extend past the axis 170. Additionally, a tensile force 163 is generated in the tension baseplate 118B, during swaging. Due to the uppercut 137 in the tension swage boss 128, the tensile force 163 is perpendicular to the swaging axis 110 and located adjacent the inner surface 145 of the tension baseplate 118B, such that the tension baseplate 118B is pushed tightly into the carriage-arm tip 106 to minimize tension baseplate 118B deformation and carriage-arm tip 106 deformation.

Additionally, during the swaging process, the compression swage boss 126 experiences multiple forces, including a clamping force 166, compression force 164, and a buckling force 168. The clamping force 166 forces the outer periphery 152 of the compression swage boss 126 against the inner periphery 154 of the swaging hole 108. The compression force 164 forces the compression swage boss 126 at an angle away from the swaging axis 110 towards the outer surface 144 of the compression baseplate 118A. The buckling force forces the compression swage boss 126 downward, parallel to the swaging axis 110 in the force direction 137. Together, the clamping force 166, the compression force 164, and the buckling force 168 cause the outer periphery 152 of the compression swage boss 126 to tightly engage (i.e., clamp) with the inner periphery 154 of the swaging hole 108. Additionally, a push force 169 is generated in the compression baseplate 118A during swaging. The push force 169 is perpendicular to the force direction 137 in the compression baseplate 118A and located adjacent the outer surface 144 of the compression baseplate.

Figure 8:
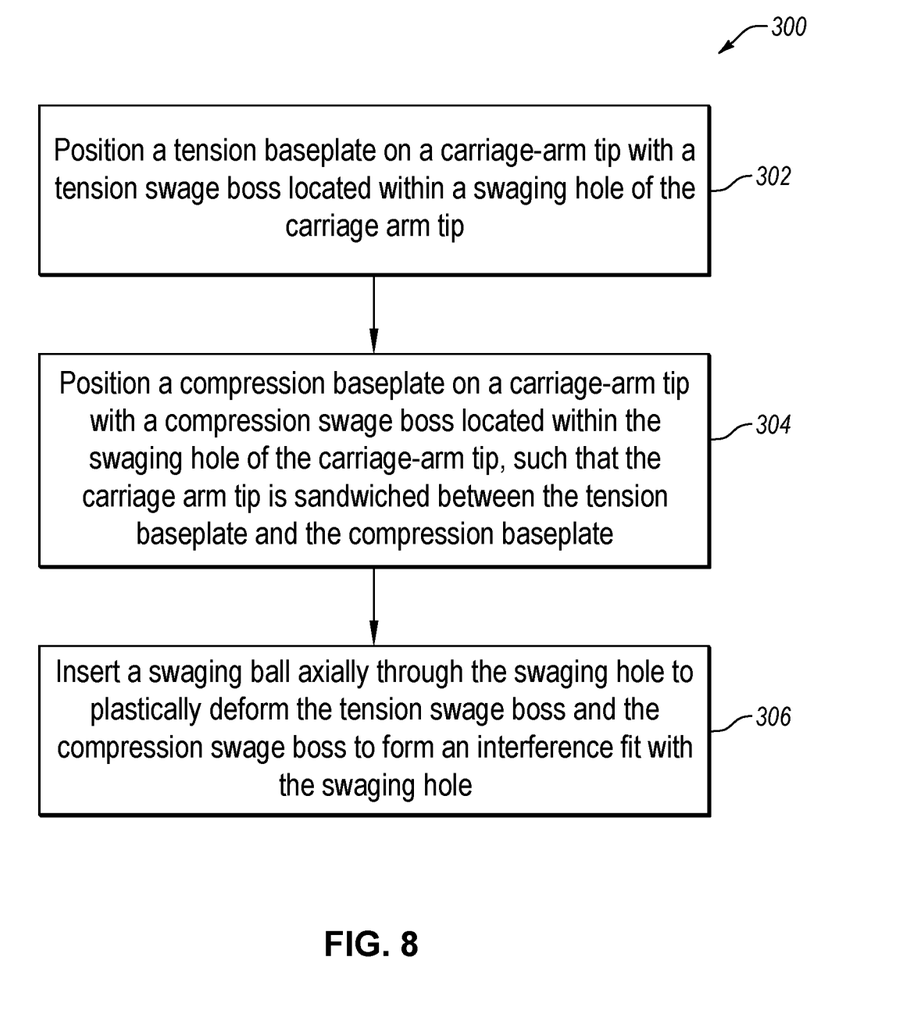
FIG. 8 is a schematic flow diagram of a method of coupling a head-gimbal assembly to a carriage arm, according to one or more examples of the present disclosure.

Now referring to FIG. 8, one example of a method 300 of coupling a head-gimbal assembly 109 to a carriage arm 105 is shown. The method 300 includes (block 302) positioning a tension baseplate 118B of a first head-gimbal assembly 109 on a carriage-arm tip 106 of a carriage arm 105. A tension swage boss 128 is located within a swaging hole 108, of the carriage-arm tip 106, and is concentric with a swaging axis 110 of the swaging hole 108. The method 300 also includes (block 304) positioning a compression baseplate 118A of a second head-gimbal assembly 109 on a carriage-arm tip 106 of a carriage arm 105, such that the carriage-arm tip 106 is sandwiched between the tension baseplate 118B and the compression baseplate 118A. A compression swage boss 126 is located within the swaging hole 108, of the carriage-arm tip 106, and is concentric with the swaging axis 110 of the swaging hole 108. The compression swage boss 126 is spaced apart from the tension swage boss 128 along the swaging axis 110. The method further includes (block 306) inserting a swaging ball 136 axially through the swaging hole 108 in an insertion direction and plastically deforming the tension swage boss 128 and the compression swage boss 126 to form an interference fit between an outer periphery 150 of the tension swage boss 128 against an inner periphery 154 of the swaging hole 108 and an interference fit between an outer periphery 152 of the compression swage boss 126 against the inner periphery 154 of the swaging hole 108.

The tension swage boss 128 includes an uppercut 137 and a tension-boss undercut 138. The uppercut 137 extends radially outward, away from the swaging axis 110, from a first backbore diameter $BB_1$ to a second backbore diameter $BB_2$ and has an uppercut depth $D_1$, in a direction parallel to the swaging axis 110. The tension-boss undercut 138 extends radially, away from the swaging axis 110, from the tension-boss outer diameter OD to a first undercut diameter $TU_D$ and has a tension-boss undercut depth $D_2$, in a direction parallel to the swaging axis 110. The compression swage boss 126 comprises a compression-boss undercut 140. The compression-boss undercut 140 extends radially outward, away from the swaging axis 110 from a compression-boss outer diameter OD to a second undercut diameter $CU_D$ and has a compression-boss undercut depth $D_3$, in a direction parallel to the swaging axis 110.

Although described in a depicted order, the method may proceed in any of a number of ordered combinations.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. A hard disk drive comprising:
   a housing, defining an interior cavity;
   a plurality of magnetic disks within the interior cavity; and
   a carriage assembly, within the interior cavity, the carriage assembly comprising:
      a head stack assembly comprising a carriage arm, the carriage arm comprising a carriage-arm tip that comprises a swaging hole centered about a swaging axis and passing through the carriage-arm tip from a first side of the carriage-arm tip to a second side of the carriage-arm tip that is opposite the first side;
      a first head-gimbal assembly, comprising a tension baseplate on the first side of the carriage-arm tip and comprising a tension swage boss located within the swaging hole, wherein the tension swage boss is annular, is centered about the swaging axis, has a tension-boss inner diameter, and has a tension-boss outer diameter; and
      a second head-gimbal assembly, comprising a compression baseplate on the second side of the carriage-arm tip and comprising a compression swage boss located within the swaging hole and spaced apart from the tension swage boss along the swaging axis, wherein the compression swage boss is annular, is centered about the swaging axis, has a compression-boss inner diameter, and has a compression-boss outer diameter;
   wherein:
      the tension swage boss comprises an uppercut and a tension-boss undercut;
      the uppercut extends radially outward, away from the swaging axis, from a first backbore diameter to a second backbore diameter and has an uppercut depth, in a direction parallel to the swaging axis;
      the tension-boss undercut extends radially, away from the swaging axis, from the tension-boss outer diameter to a first undercut diameter and has a tension-boss undercut depth, in a direction parallel to the swaging axis;
      the compression swage boss comprises a compression-boss undercut;

the compression-boss undercut extends radially outward, away from the swaging axis, from the compression-boss outer diameter to a second undercut diameter and has a compression-boss undercut depth, in a direction parallel to the swaging axis; and
a swaging ball is insertable through the swaging hole such that, as the swaging ball is inserted through the swaging hole, an interference fit is formed between an outer periphery of the tension swage boss and an inner periphery of the swaging hole and an outer periphery of the compression swage boss and the inner periphery of the swaging hole.

2. The hard disk drive of claim 1 wherein the tension swage boss converges, in a force direction along the swaging axis, from the second backbore diameter to the first backbore diameter and to the tension-boss inner diameter.

3. The hard disk drive of claim 1 wherein:
the second backbore diameter of the tension baseplate is greater than the inner periphery of the swaging hole; and
the first backbore diameter of the tension baseplate is less than the inner periphery of the swaging hole.

4. The hard disk drive of claim 1 wherein:
the second backbore diameter of the tension baseplate is greater than the tension-boss outer diameter; and
the first backbore diameter of the tension baseplate is less than the tension-boss outer diameter.

5. The hard disk drive of claim 1 wherein:
the compression swage boss comprises a third backbore diameter; and
the third backbore diameter of the compression swage boss is less than the second backbore diameter of the tension swage boss.

6. The hard disk drive of claim 1 wherein a minimum thickness of the tension baseplate is less than a minimum thickness of the compression baseplate.

7. The hard disk drive of claim 1 wherein the compression-boss undercut depth is greater than the tension-boss undercut depth.

8. The hard disk drive of claim 1 wherein:
the tension baseplate has a tension baseplate thickness; and
the tension-boss undercut depth is less than 24 percent of the tension plate thickness.

9. The hard disk drive of claim 1 wherein:
the compression baseplate has a compression baseplate thickness; and
the compression-boss undercut depth is greater than 24 percent of the compression plate thickness.

10. The hard disk drive of claim 1 wherein the second undercut diameter is greater than the first undercut diameter.

11. The hard disk drive of claim 1 wherein the tension-boss inner diameter is less than the compression-boss inner diameter.

12. The hard disk drive of claim 11 where the tension-boss inner diameter is at least 0.02 mm less than the compression-boss inner diameter.

13. The hard disk drive of claim 1 wherein:
a first height of the tension swage boss is equal to a second height of the compression swage boss; and
the first height and the second height are less than 0.2 mm.

14. The hard disk drive of claim 13 wherein the first height and the second height is 0.19 mm.

15. The hard disk drive of claim 1 wherein:
the swaging ball has a ball diameter; and
the tension-boss inner diameter is between 4 percent to 15 percent smaller than the ball diameter.

16. The hard disk drive of claim 15 wherein the tension-boss inner diameter is between 5 percent to 8 percent smaller than the ball diameter.

17. The hard disk drive of claim 1 wherein:
the plurality of magnetic disks comprises ten magnetic disks; and
the head stack assembly comprises nine carriage arms, each one of the carriage arms sandwiched between the corresponding first head-gimbal assembly and the corresponding second head-gimbal assembly, the head stack assembly further comprising:
a top-most carriage arm, positioned above the nine carriage arms, the compression swage boss of a top-most second head-gimbal assembly located within the swaging hole of the carriage-arm tip of the top-most carriage arm; and
a bottom-most carriage arm, positioned below the nine carriage arms, the tension swage boss of a bottom-most first head-gimbal assembly located within the swaging hole of the carriage-arm tip of the bottom-most carriage arm.

18. A carriage assembly for a hard disk drive, the carriage assembly comprising:
a head stack assembly comprising a carriage arm, the carriage arm comprising a carriage-arm tip that comprises a swaging hole centered about a swaging axis and passing through the carriage-arm tip from a first side of the carriage-arm tip to a second side of the carriage-arm tip that is opposite the first side;
a first head-gimbal assembly, comprising a tension baseplate on the first side of the carriage-arm tip and comprising a tension swage boss located within the swaging hole, wherein the tension swage boss is annular, is centered about the swaging axis, has a tension-boss inner diameter, and has a tension-boss outer diameter; and
a second head-gimbal assembly, comprising a compression baseplate on the second side of the carriage-arm tip and comprising a compression swage boss located within the swaging hole and spaced apart from the tension swage boss along the swaging axis, wherein the compression swage boss is annular, is centered about the swaging axis, has a compression-boss inner diameter, and has a compression-boss outer diameter;
wherein:
the tension swage boss comprises an uppercut and a tension-boss undercut;
the uppercut extends radially outward, away from the swaging axis, from a first backbore diameter to a second backbore diameter and has an uppercut depth, in a direction parallel to the swaging axis;
the tension-boss undercut extends radially, away from the swaging axis, from the tension-boss outer diameter to a first undercut diameter and has a tension-boss undercut depth, in a direction parallel to the swaging axis; and
a swaging ball is insertable through the swaging hole such that, as the swaging ball is inserted through the swaging hole, an interference fit is formed between an outer periphery of the tension swage boss and an inner periphery of the swaging hole and an outer periphery of the compression swage boss and the inner periphery of the swaging hole.

19. The carriage assembly of claim 18, wherein the head stack assembly comprises nine carriage arms, each one of the carriage arms sandwiched between the corresponding first head-gimbal assembly and the corresponding second head-gimbal assembly, the head stack assembly further comprising:
- a top-most carriage arm, positioned above the nine carriage arms, the compression swage boss of a top-most second head-gimbal assembly located within the swaging hole of the carriage-arm tip of the top-most carriage arm; and
- a bottom-most carriage arm, positioned below the nine carriage arms, the tension swage boss of a bottom-most first head-gimbal assembly located within the swaging hole of the carriage-arm tip of the bottom-most carriage arm.

20. The carriage assembly of claim 18, wherein:
- the compression swage boss comprises a compression-boss undercut; and
- the compression-boss undercut extends radially outward, away from the swaging axis, from the compression-boss outer diameter to a second undercut diameter and has a compression-boss undercut depth, in a direction parallel to the swaging axis.

21. A method of coupling a head-gimbal assembly to a carriage arm, the method comprising:
- positioning a tension baseplate of a first head-gimbal assembly on a carriage-arm tip of a carriage arm such that a tension swage boss is located within a swaging hole, on the carriage-arm tip and concentric with a swaging axis of the swaging hole;
- positioning a compression baseplate of a second head-gimbal assembly on a carriage arm tip of a carriage arm such that the carriage arm tip is sandwiched between the tension baseplate and the compression baseplate, a compression swage boss located within the swaging hole and concentric with the swaging axis of the swaging hole and the compression swage boss spaced apart from the tension swage boss along the swaging axis; and
- inserting a swaging ball axially through the swaging hole in an insertion direction and plastically deforming the tension swage boss and the compression swage boss to form an interference fit between an outer periphery of the tension swage boss against an inner periphery of the swaging hole and an interference fit between an outer periphery of the compression swage boss against the inner periphery of the swaging hole;

wherein:
- the tension swage boss comprises an uppercut and a tension-boss undercut;
- the uppercut extends radially outward, away from the swaging axis, from a first backbore diameter to a second backbore diameter and has an uppercut depth, in a direction parallel to the swaging axis;
- the tension-boss undercut extends radially, away from the swaging axis, from a tension-boss outer diameter to a first undercut diameter and has a tension-boss undercut depth, in a direction parallel to the swaging axis;
- the compression swage boss comprises a compression-boss undercut; and
- the compression-boss undercut extends radially outward, away from the swaging axis, from a compression-boss outer diameter to a second undercut diameter and has a compression-boss undercut depth, in a direction parallel to the swaging axis.

* * * * *